(12) United States Patent
Jeon

(10) Patent No.: US 12,397,773 B2
(45) Date of Patent: Aug. 26, 2025

(54) HYBRID VEHICLE

(71) Applicant: SUBARU CORPORATION, Tokyo (JP)

(72) Inventor: Daeho Jeon, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 267 days.

(21) Appl. No.: 18/341,168

(22) Filed: Jun. 26, 2023

(65) Prior Publication Data

US 2024/0017713 A1 Jan. 18, 2024

(30) Foreign Application Priority Data

Jul. 13, 2022 (JP) .................................. 2022-112792

(51) Int. Cl.
*B60W 20/12* (2016.01)
*B60W 10/06* (2006.01)
*B60W 10/08* (2006.01)

(52) U.S. Cl.
CPC ............ *B60W 20/12* (2016.01); *B60W 10/06* (2013.01); *B60W 10/08* (2013.01)

(58) Field of Classification Search
CPC ...... B60W 20/12; B60W 10/06; B60W 10/08; B60W 2556/10; B60W 2556/50; B60W 10/26; B60W 20/13; B60W 20/14; B60W 20/40; B60W 30/182; B60K 2006/4825; B60K 6/48; Y02T 10/62
See application file for complete search history.

(56) References Cited

U.S. PATENT DOCUMENTS

| 10,471,947 | B1 * | 11/2019 | Sheriff | B60T 17/221 |
| 2010/0138089 | A1 * | 6/2010 | James | B60K 6/46 477/3 |
| 2010/0280687 | A1 * | 11/2010 | Tate, Jr. | B60W 10/26 903/903 |

FOREIGN PATENT DOCUMENTS

| CN | 104276164 | A | * | 1/2015 | ............. B60L 15/20 |
| CN | 109291912 | A | * | 2/2019 | ............. B60W 10/06 |
| CN | 111196265 | A | * | 5/2020 | ............. B60W 10/04 |
| JP | 2004-245190 | A | | 9/2004 | |
| JP | 2009248822 | A | * | 10/2009 | ............. B60L 11/14 |
| RU | 2662330 | C2 | * | 7/2018 | ............. B60L 11/18 |

* cited by examiner

*Primary Examiner* — Mary Cheung
(74) *Attorney, Agent, or Firm* — Rimon P.C.

(57) ABSTRACT

A hybrid vehicle as a vehicle includes a traveling engine, a traveling motor, a receiver, a storage, and a processor. The receiver is configured to acquire a position of the vehicle. The storage is configured to store a parking position including home of a user of the vehicle. The processor is configured to control a drive mode of the vehicle to set the drive mode to a first drive mode that is based on the traveling engine or a second drive mode that is based on the traveling motor. The processor is configured to control the drive mode of the vehicle to set the drive mode to the first drive mode when the vehicle has reached the vicinity of the parking position.

6 Claims, 8 Drawing Sheets

HYBRID VEHICLE

CROSS-REFERENCE TO RELATED APPLICATIONS

The present application claims priority from Japanese Patent Application No. 2022-112792 filed on Jul. 13, 2022, the entire contents of which are hereby incorporated by reference.

BACKGROUND

The disclosure relates to a hybrid vehicle.

A hybrid vehicle including a traveling engine and a traveling motor as drive sources gains support from many users. The hybrid vehicle makes it possible to improve a fuel efficiency by using the traveling engine and the traveling motor in combination. If the driving of the traveling motor is prioritized, it is possible to expect a further improvement in the fuel efficiency.

However, the traveling motor is driven by receiving a supply of electric power from a battery. The battery is in a discharge mode when the traveling motor is driven, and the battery is in a charging mode when the traveling engine serves as the drive source. Accordingly, it is necessary to switch the drive sources while monitoring a charging amount of the battery.

For example, Japanese Unexamined Patent Application Publication (JP-A) No. 2004-245190 discloses a technique related to a hybrid vehicle that controls electric power generation of a motor generator based on a remaining distance to a destination.

SUMMARY

An aspect of the disclosure provides a hybrid vehicle as a vehicle. The hybrid vehicle includes a traveling engine, a traveling motor, a receiver, a storage, and a processor. The receiver is configured to acquire a position of the vehicle. The storage is configured to store a parking position including home of a user of the vehicle. The processor is configured to control a drive mode of the vehicle to set the drive mode to a first drive mode that is based on the traveling engine or a second drive mode that is based on the traveling motor, and control the drive mode of the vehicle to set the drive mode to the first drive mode when the vehicle has reached the vicinity of the parking position.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
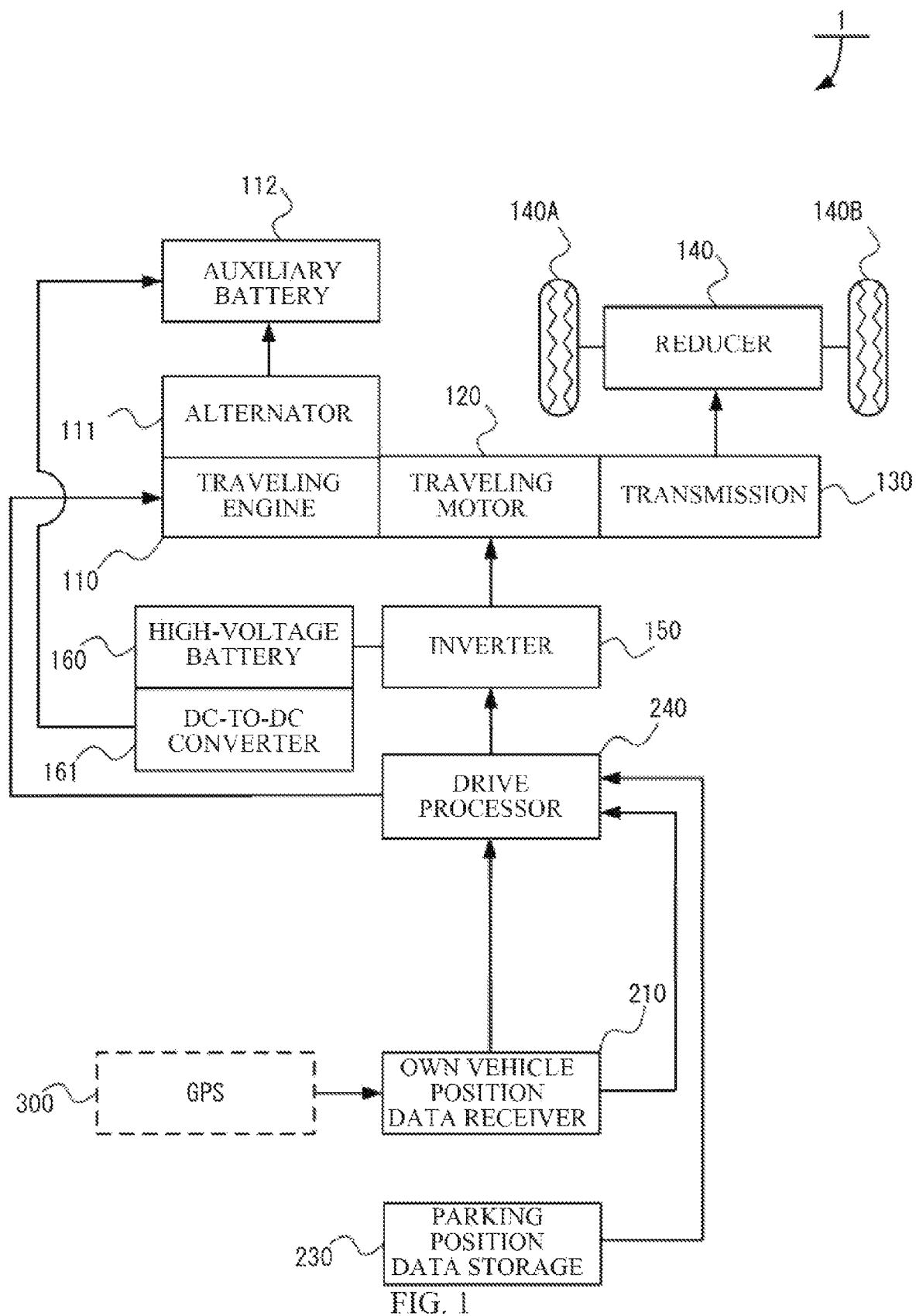
FIG. 1 is a diagram illustrating a configuration of a hybrid vehicle according to one example embodiment of the disclosure.

In general, a hybrid vehicle having a navigation capability involves an increase in the number of times of applying the brakes when the vehicle reaches the vicinity of a destination. In this case, a condition of driving a motor is satisfied in response to a reduction in a vehicle speed.

That is, even a hybrid vehicle disclosed in JP-A No. 2004-245190 involves an increase in driving of a drive motor inevitably when the hybrid vehicle reaches the vicinity of the destination, which often leads to storing of the hybrid vehicle with remaining battery amounts of both a high-voltage battery and an auxiliary battery being small.

Further, traveling without setting the destination makes it difficult to calculate a remaining distance to the destination, which also leads to storing of the hybrid vehicle with the remaining battery amounts of both the high-voltage battery and the auxiliary battery being small.

Accordingly, when a storage period of the hybrid vehicle is long, an event such as a restarting malfunction or a long cranking can occur due to a decrease in a battery voltage at the time of restart.

It is desirable to provide a hybrid vehicle that controls a drive mode of the hybrid vehicle to set the drive mode to a drive mode that is based on a traveling engine when the hybrid vehicle reaches the vicinity of a parking position.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. First Example Embodiment

A hybrid vehicle 1 according to a first example embodiment will be described with reference to FIGS. 1 and 2.
<Configuration of Hybrid Vehicle 1>
Referring to FIG. 1, the hybrid vehicle 1 according to the example embodiment may include a traveling engine 110, an alternator 111, an auxiliary battery 112, a traveling motor 120, a transmission 130, a reducer 140, an inverter 150, a high-voltage battery 160, a DC-to-DC converter 161, an own vehicle position data receiver 210, a parking position data storage 230, and a drive processor 240. In one embodiment, the own vehicle position data receiver 210 may serve as a "receiver". In one embodiment, the parking position data storage 230 may serve as a "storage". In one embodiment, the drive processor 240 may serve as a "processor".

The hybrid vehicle 1 may include the traveling engine 110 and the traveling motor 120 as traveling drive sources.

The hybrid vehicle 1 may travel by a drive force of the traveling engine 110 or the traveling motor 120.

The drive force of the traveling engine 110 and the traveling motor 120 may be transmitted to drive wheels 140A and 140B via the transmission 130 and the reducer 140.

The alternator 111 may supply electric power directed to, for example, displaying of an instrument while traveling, and charge the auxiliary battery 112 while traveling.

The auxiliary battery 112 may be any battery such as a lead-acid battery, and supply electric power to a backup memory and an in-vehicle device upon start-up of a hybrid system or parking.

The inverter 150 may convert a DC electric power of the high-voltage battery 160 into an AC electric power and supply the AC electric power to the traveling motor 120 to generate the traveling drive force derived from the traveling motor 120.

The inverter 150 may convert an AC electric power generated by the traveling motor 120 into a DC electric power to charge the high-voltage battery 160 and generate a regenerative braking derived force from the traveling motor 120.

The hybrid vehicle 1 may include an unillustrated SOC (State of Charge) sensor. The SOC sensor may detect a terminal voltage of the high-voltage battery 160 by a voltage sensor, detect a charge/discharge current of the high-voltage battery 160 by a current sensor, and detect the SOC based on the detected voltage and current of the high-voltage battery 160.

The DC-to-DC converter 161 may transform the DC electric power outputted from the high-voltage battery 160 and supply the transformed DC electric power to the auxiliary battery 112.

The own vehicle position data receiver 210 may acquire a position of an own vehicle, i.e., the hybrid vehicle 1.

For example, the own vehicle position data receiver 210 may acquire data on latitude and longitude of the own vehicle to determine a current position of the own vehicle based on, for example, GPS (Global Positioning System) 300.

The own vehicle position acquired by the own vehicle position data receiver 210 may be output to the later-described drive processor 240.

The parking position data storage 230 may be any storage such as RAM (Random Access Memory) or a flash memory, and store, for example, a parking position at which the own vehicle is parked for a long time, such as home.

Data in the parking position data storage 230 may be read by the later-described drive processor 240.

The drive processor 240 may control a drive mode of the own vehicle to set the drive mode to a drive mode that is based on the traveling engine 110 or a drive mode that is based on the traveling motor 120. In one embodiment, the drive mode based on the traveling engine 110 may serve as a "first drive mode". In one embodiment, the drive mode based on the traveling motor 120 may serve as a "second drive mode".

For example, the drive processor 240 controls the drive mode of the own vehicle to set the drive mode to the drive mode that is based on the traveling engine 110 when the own vehicle has reached the vicinity of the parking position.

The determination as to whether the own vehicle has reached the vicinity of the parking position may be based on position information, distance information, or arrival time information.

<Process of Hybrid Vehicle 1>

An example of a process to be performed by the hybrid vehicle 1 according to the example embodiment will be described with reference to FIG. 4.

Figure 2:
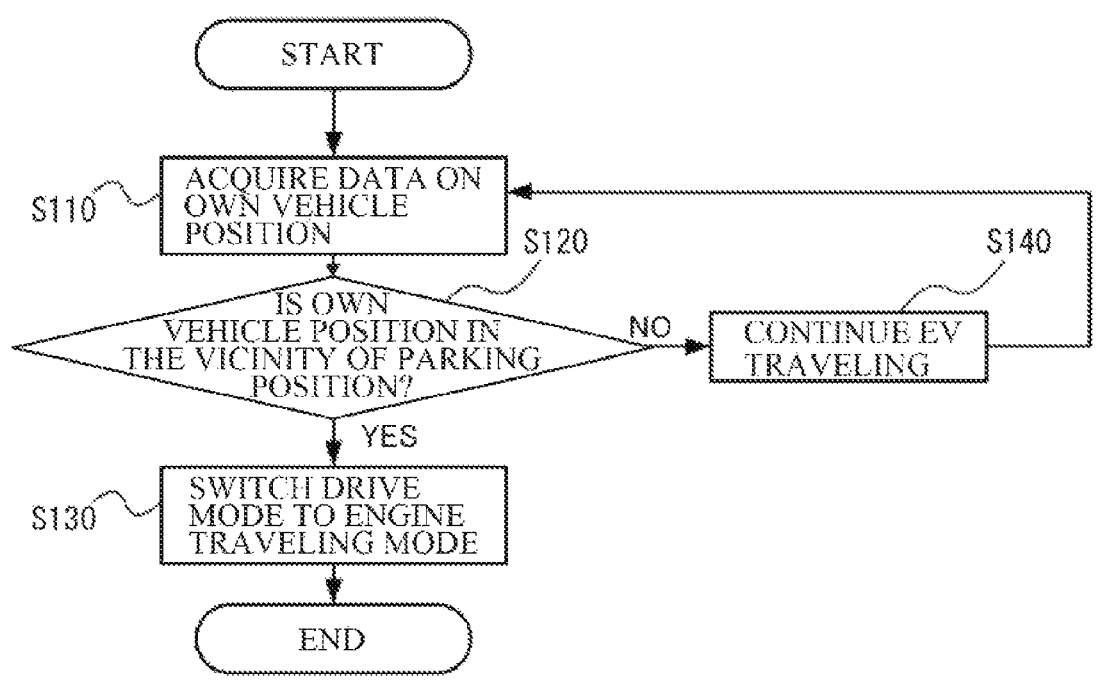
FIG. 2 is a diagram illustrating a flow of process to be performed by the hybrid vehicle illustrated in FIG. 1.

Referring to FIG. 2, the own vehicle position data receiver 210 may acquire data on a position of the own vehicle (step S110).

The position of the own vehicle acquired by the own vehicle position data receiver 210 may be outputted to the drive processor 240.

The drive processor 240 may determine whether the position of the own vehicle is in the vicinity of the parking position, based on the position of the own vehicle acquired by the own vehicle position data receiver 210 (step S120).

If the drive processor 240 determines that the position of the own vehicle is not in the vicinity of the parking position based on the position of the own vehicle acquired by the own vehicle position data receiver 210 ("NO" in step S120), the drive processor 240 may cause the hybrid vehicle 1 to continue EV (Electric Vehicle) traveling (step S140), and may return the process to step S110.

If the drive processor 240 determines that the position of the own vehicle is in the vicinity of the parking position based on the position of the own vehicle acquired by the own vehicle position data receiver 210 ("YES" in step S120), the drive processor 240 may switch the drive mode of the own vehicle from the EV traveling mode to an engine traveling mode, and end the process (step S130).

<Workings and Example Effects>

The drive processor 240 of the hybrid vehicle 1 according to the example embodiment described above controls the drive mode of the own vehicle to set the drive mode to the drive mode that is based on the traveling engine 110 when the own vehicle has reached the vicinity of the parking position.

Thus, the drive processor 240 changes, for example, the drive mode of the own vehicle, which has been in the drive mode that is based on the traveling motor 120, to the drive mode that is based on the traveling engine 110, which helps to allow the high-voltage battery 160 and the auxiliary battery 112 to be in a forced charging mode. Accordingly, this configuration helps to expect a performance improvement of the high-voltage battery 160 and the auxiliary battery 112, especially the auxiliary battery 112, in a place where the own vehicle is likely to be parked for a long time, such as at home.

Further, the performance improvement of the high-voltage battery 160 and the auxiliary battery 112, especially the auxiliary battery 112, helps to prevent a voltage drop upon restarting and to improve a long cranking or a restarting malfunction.

Second Example Embodiment

A hybrid vehicle 1A according to a second example embodiment will be described with reference to FIGS. 3 to 6.

<Configuration of Hybrid Vehicle 1A>

Figure 3:
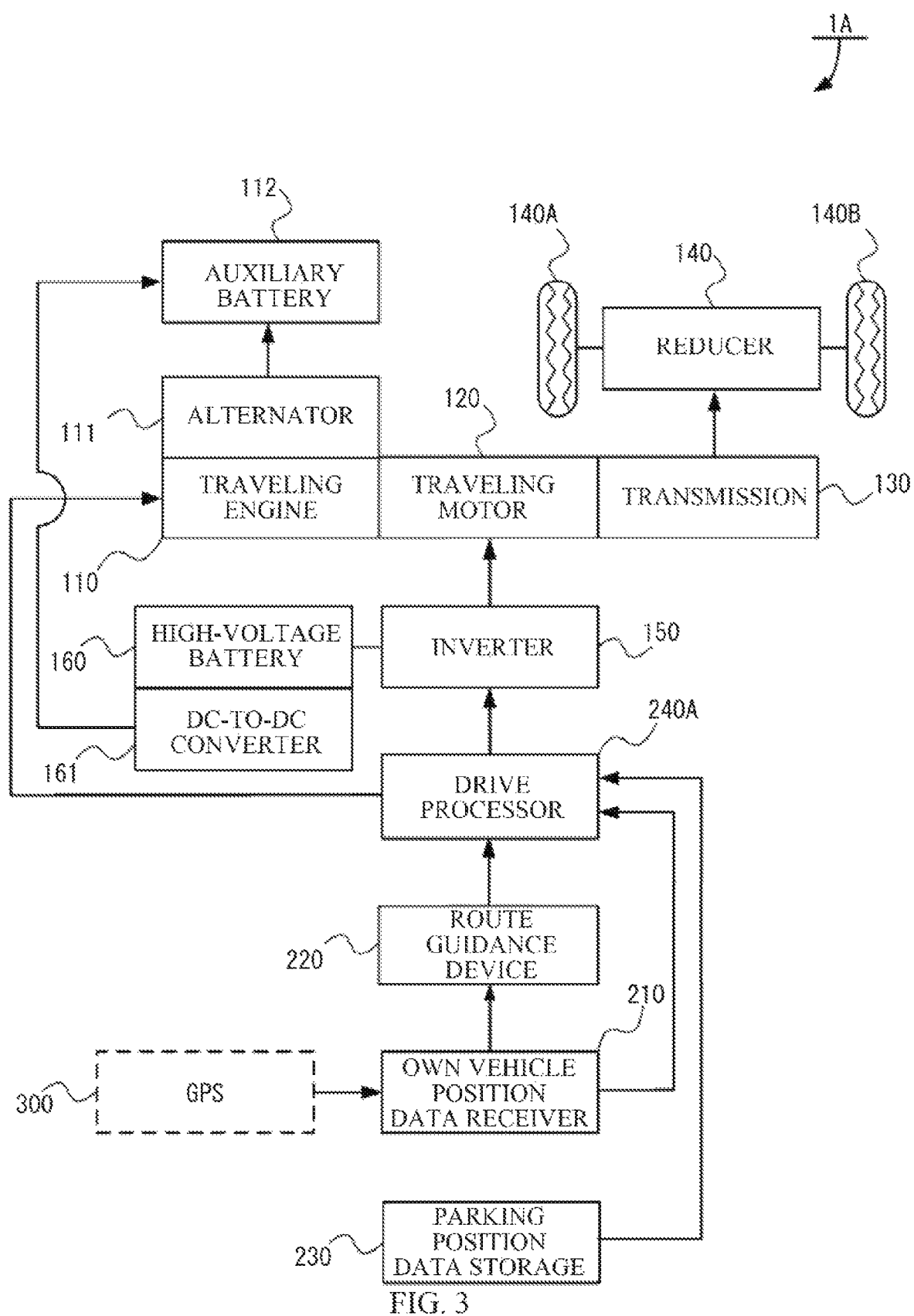
FIG. 3 is a diagram illustrating a configuration of a hybrid vehicle according to one example embodiment of the disclosure.

Referring to FIG. 3, the hybrid vehicle 1A according to the example embodiment may include the traveling engine 110, the alternator 111, the auxiliary battery 112, the traveling motor 120, the transmission 130, the reducer 140, the inverter 150, the high-voltage battery 160, the DC-to-DC converter 161, the own vehicle position data receiver 210, a route guidance device 220, the parking position data storage 230, and a drive processor 240A.

It should be noted that the same reference numbers as in the first example embodiment may have the similar operations and detailed description thereof will be omitted accordingly.

The route guidance device 220 may perform a route guidance on the own vehicle, based on a position of the own vehicle and a destination designated by a user.

The route guidance device 220 may be a so-called navigation device. The route guidance device 220 may guide the own vehicle to the destination designated by the user while referring to stored map data.

Figure 4:
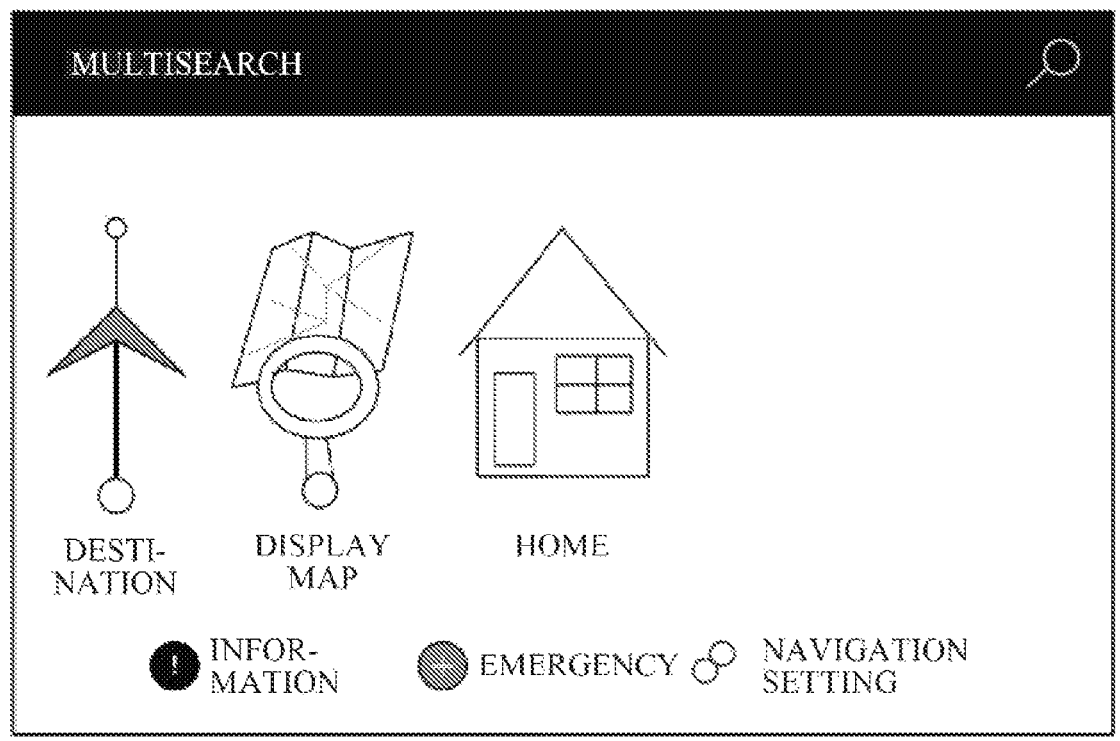
FIG. 4 is a diagram exemplifying a destination input screen of a route guidance device of the hybrid vehicle illustrated in FIG. 3.

FIG. 4 illustrates an example of an input screen of the destination, of the route guidance device 220, to be inputted by the user. When the user touches "destination", it is possible to search the destination by a factor such as an address, a facility name, or a telephone number.

When "display map" is touched, it is possible to search the destination on the map.

When "home" is touched, it is possible to set the "home" as the destination as it is, on the premise that position data of the "home" is already stored.

The route guidance device 220 may receive an input of a parking position from the user at which the own vehicle is to be parked for a long period of time, such as home. The route guidance device 220 may store the inputted parking position in the parking position data storage 230.

Figure 5:
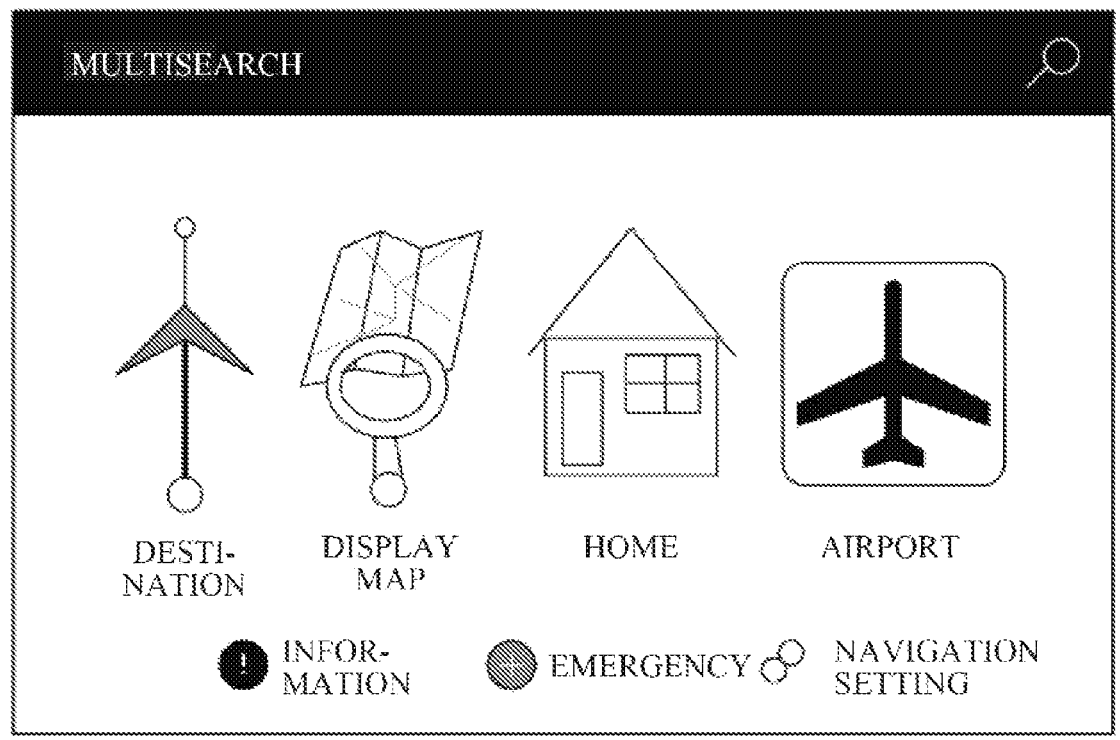
FIG. 5 is a diagram exemplifying the destination input screen of the route guidance device of the hybrid vehicle illustrated in FIG. 3.

For example, when the user inputs "airport" as the parking position at which the own vehicle is to be parked for a long period of time, the input screen of the destination of the route guidance device 220 is as illustrated by way of example in FIG. 5.

When the own vehicle has reached the vicinity of the destination, the route guidance device 220 may output, to the later-described drive processor 240A, a signal indicating that the own vehicle has reached the vicinity of the destination.

The drive processor 240A may control the drive mode of the own vehicle to set the drive mode to the drive mode that is based on the traveling engine 110 or the drive mode that is based on the traveling motor 120.

For example, when the destination and the parking position stored in the parking position data storage 230 match with each other, the drive processor 240A may control, based on a distance to the destination, the drive mode of the own vehicle to set the drive mode to the drive mode that is based on the traveling engine 110. The distance to the destination may be based on the position of the own vehicle obtained from the own vehicle position data receiver 210 and the destination.

In the above example, whether the own vehicle has reached the vicinity of the destination may be determined based on the distance. In some embodiments, whether the own vehicle has reached the vicinity of the destination may be determined based on the arrival time.

<Process of Hybrid Vehicle 1A>

An example of a process to be performed by the hybrid vehicle 1A according to the example embodiment will be described with reference to FIG. 6.

Figure 6:
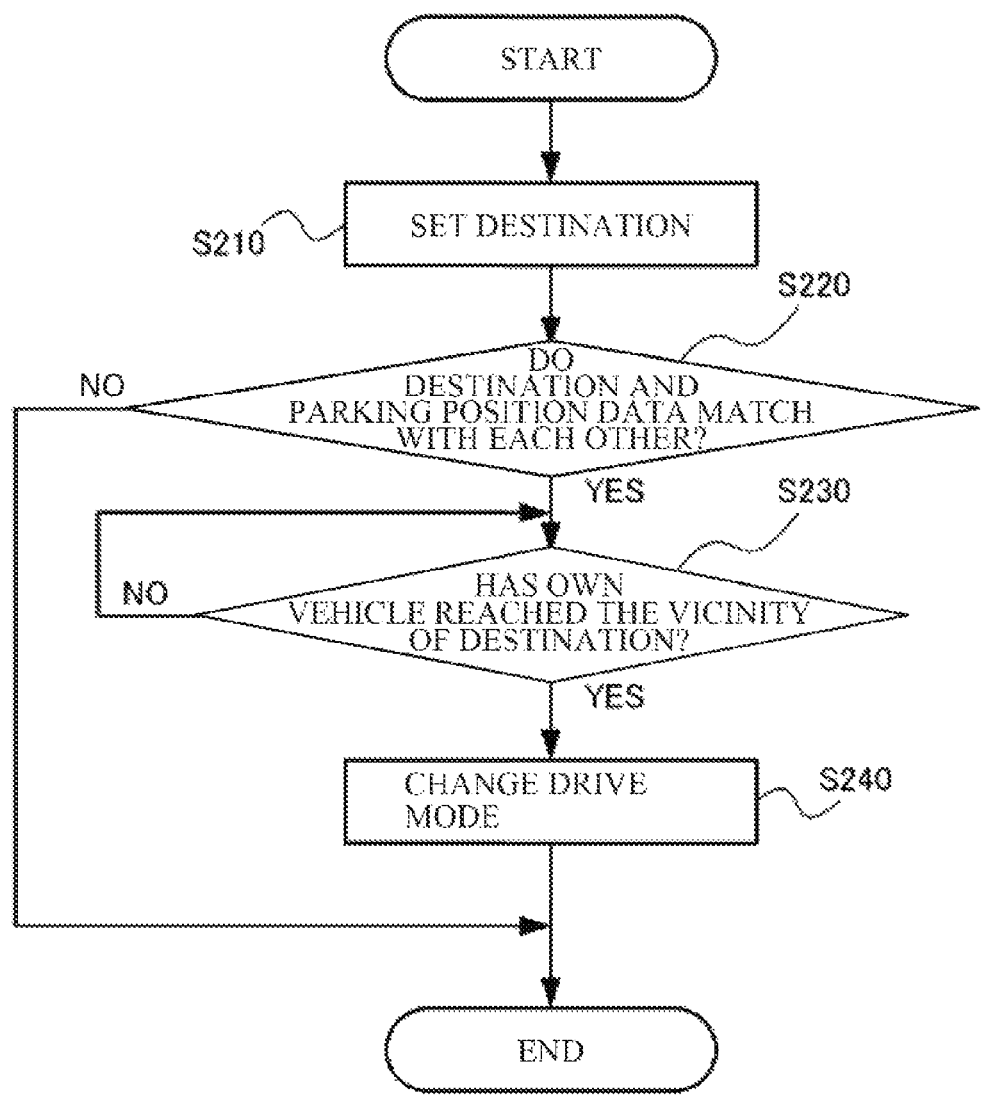
FIG. 6 is a diagram illustrating a flow of process to be performed by the hybrid vehicle illustrated in FIG. 3.

Referring to FIG. 6, the user may set a destination on a destination setting screen of the route guidance device 220 (step S210).

It should be noted that the setting of the destination may be based on a "destination" icon, a "display map" icon, or a preset individual icon.

The destination set by the user may be outputted to the drive processor 240A.

When an input of the destination is received from the route guidance device 220, the drive processor 240A may search the parking position data storage 230 for a parking position that matches the inputted destination to determine whether there is a parking position that matches the destination (step S220).

If the drive processor 240A determines that there is no parking position that matches the destination ("NO" in step S220), the drive processor 240A may end the process.

If the drive processor 240A determines that there is a parking position that matches the destination ("YES" in step S220), the drive processor 240A may determine whether the own vehicle has reached the vicinity of the destination, based on the position of the own vehicle obtained from the own vehicle position data receiver 210 (step S230). If the drive processor 240A determines that the own vehicle has not reached the vicinity of the destination ("NO" in step S230), the drive processor 240A may return the process to an original state and shift to a standby mode.

If the drive processor 240A determines that the own vehicle has reached the vicinity of the destination ("YES" in step S230), the drive processor 240A may control the drive mode of the own vehicle to set the drive mode to the drive mode that is based on the traveling engine 110 (step S240), and end the process.

<Workings and Example Effects>

The route guidance device 220 of the hybrid vehicle 1A according to the example embodiment may receive the input of the parking position from the user and store the inputted parking position in the parking position data storage 230.

This allows the user to input not only the home but also the parking position, and allows for displaying of the parking position on the destination setting screen of the route guidance device 220.

Accordingly, this configuration helps to improve a performance of the high-voltage battery 160 and the auxiliary battery 112, especially the auxiliary battery 112, by a simple process to be performed by the user, which in turn helps to prevent a voltage drop upon restarting of the own vehicle and to improve a long cranking or a restarting malfunction.

First Modification Example

In the example embodiment, the drive processor 240A may control the drive mode of the own vehicle to set the drive mode to the drive mode that is based on the traveling engine 110, when the drive processor 240A determines that: the destination and the parking position stored in the parking position data storage 230 match with each other; and the own vehicle has reached the vicinity of the destination based on the distance to the destination. The distance to the destination may be based on the position of the own vehicle and the destination.

In some embodiments, the drive processor 240A may control the drive mode of the own vehicle to set the drive mode to the drive mode that is based on the traveling engine 110, when the destination and the parking position stored in the parking position data storage 230 match with each other and at the timing of performing the guidance, by the route guidance device 220, in the vicinity of the destination.

This makes it possible to control the drive mode of the own vehicle to set the drive mode to the drive mode that is based on the traveling engine 110 even when a condition of traveling based on the traveling motor 120 is still satisfied, irrespective of the remaining amounts of the high-voltage battery 160 and the auxiliary battery 112 of the own vehicle, especially the auxiliary battery 112, and of the distance to the destination.

Second Modification Example

In the example embodiment, the route guidance device 220 may receive the input of the parking position from the user and store the inputted parking position in the parking position data storage 230.

In some embodiments, the route guidance device 220 may collect a parking time at various destinations from the past route guidance history data, extract a destination that has necessitated a parking time of a predetermined time or longer based on the collected destination and the parking time at the relevant destination, and store the extracted destination in the parking position data storage 230.

Thus, it is possible to automatically set the parking position of the own vehicle.

Hence, it possible to control the drive mode of the own vehicle to set the drive mode to the drive mode that is based on the traveling engine 110 when the own vehicle has reached the vicinity of the destination, even if the user has parked the own vehicle for a long time at a destination that is not particularly intended by the user. Accordingly, this configuration helps to prevent a voltage drop upon restarting of the own vehicle and to improve a long cranking or a restarting malfunction.

Third Modification Example

In some embodiments, the drive processor 240A may control the drive mode of the own vehicle to set the drive mode to the drive mode that is based on the traveling engine 110, when the parking position is different from a destination designated by the user and the own vehicle has reached the vicinity of the destination.

In other words, when the destination is set, it is possible to prevent the drive mode from making the transition to the engine traveling mode even if the own vehicle approaches the vicinity of the parking position such as the home, which helps to expect an improvement in a fuel efficiency.

Third Example Embodiment

A hybrid vehicle 1B according to a third example embodiment will be described with reference to FIGS. 7 to 9.
<Configuration of Hybrid Vehicle 1B>

Figure 7:
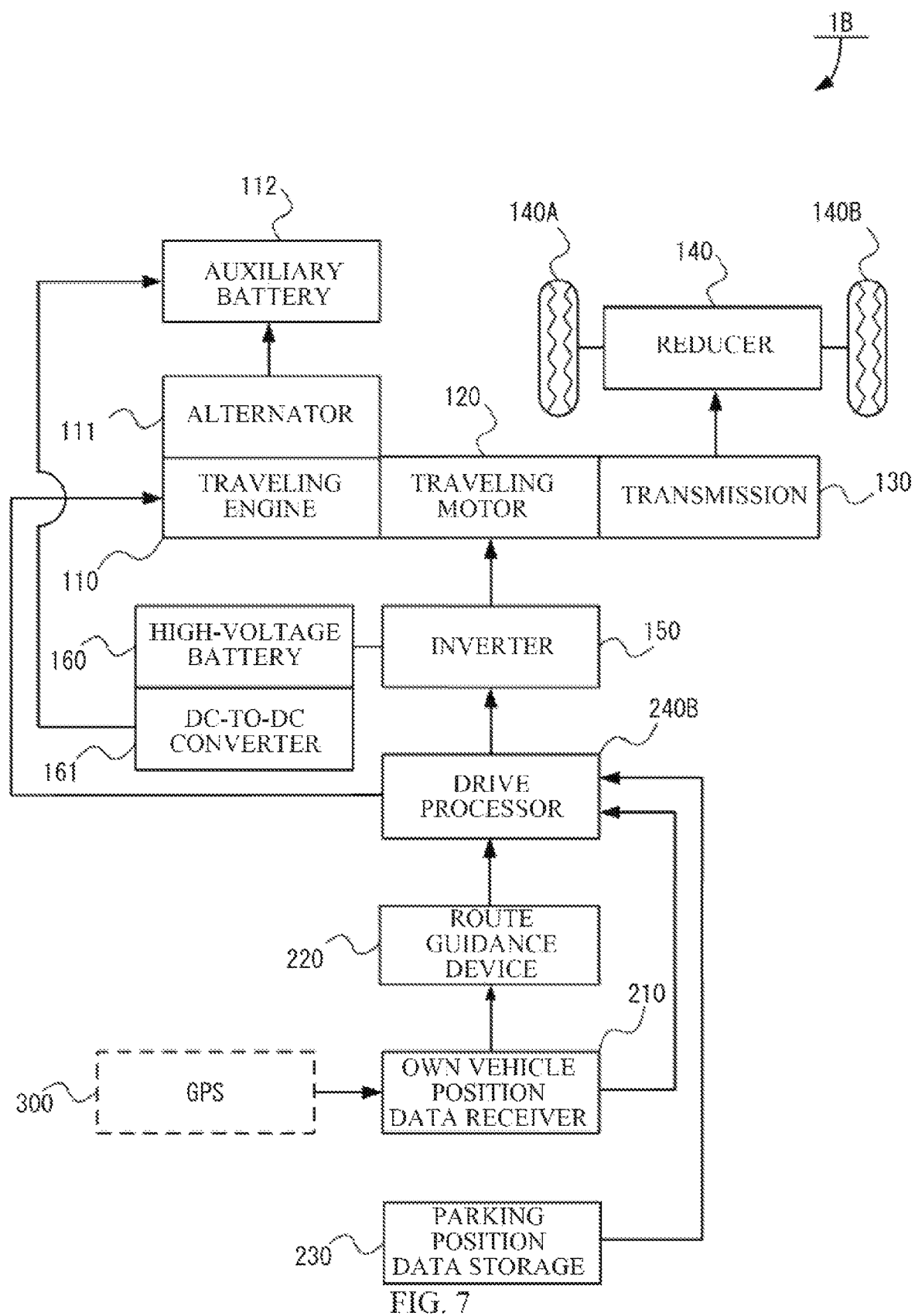
FIG. 7 is a diagram illustrating a configuration of a hybrid vehicle according to one example embodiment of the disclosure.

Referring to FIG. 7, the hybrid vehicle 1B according to the example embodiment may include the traveling engine 110, the traveling motor 120, the transmission 130, the reducer 140, the inverter 150, the high-voltage battery 160, the own vehicle position data receiver 210, the route guidance device 220, the parking position data storage 230, and a drive processor 240B.

It should be noted that the same reference numbers as in the first and the second example embodiments may have the similar operations and detailed description thereof will be omitted accordingly.

Figure 8:
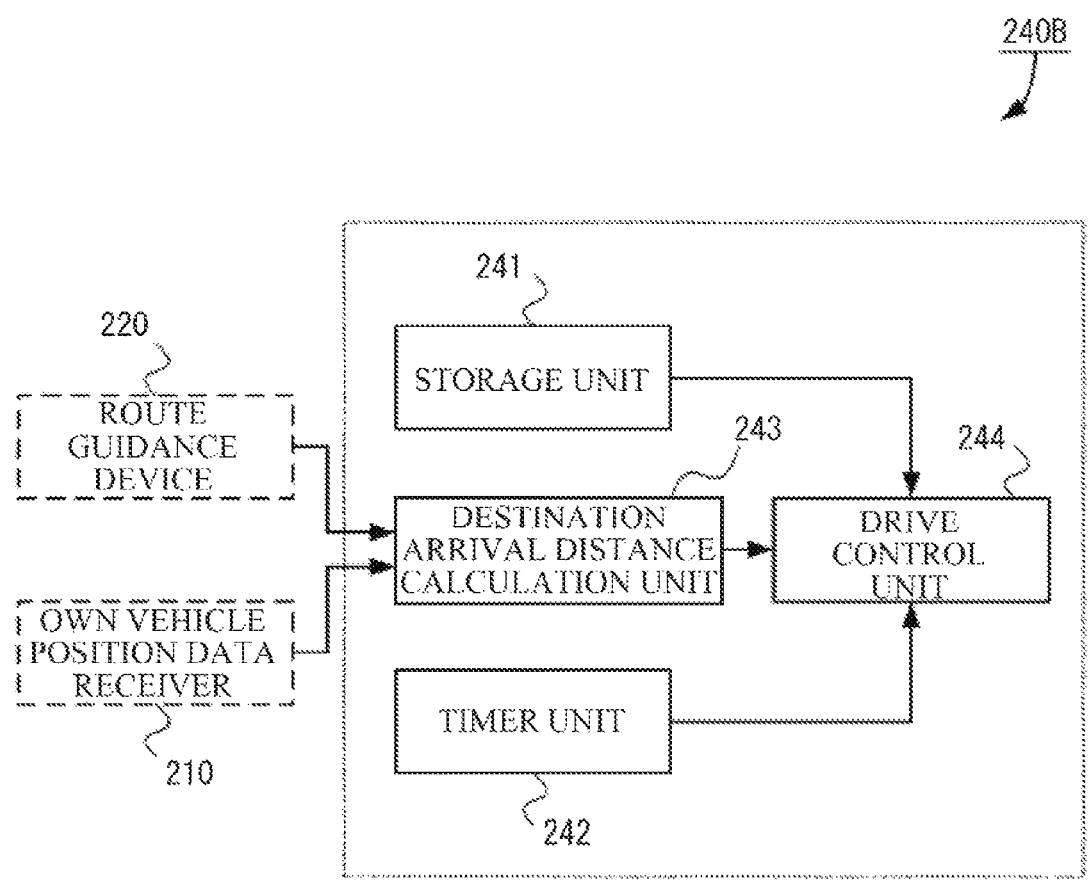
FIG. 8 is a diagram illustrating a configuration of a drive processor of the hybrid vehicle illustrated in FIG. 7.

Referring to FIG. 8, the drive processor 240B may include a storage unit 241, a timer unit 242, a destination arrival distance calculation unit 243, and a drive control unit 244.

The storage unit 241 may be any storage such as ROM (Read Only Memory) or RAM (Random Access Memory). The storage unit 241 may store a first predetermined distance and a second predetermined distance.

In some embodiments, the first predetermined distance may be a distance of about 1.5 times the distance to the destination based on which the route guidance device 220 notifies that the own vehicle is in the vicinity of the destination.

In some embodiments, the second predetermined distance may be a distance of about 0.3 times the distance to the destination based on which the route guidance device 220 notifies that the own vehicle is in the vicinity of the destination.

In some embodiments, the first predetermined distance and the second predetermined distance may be varied depending on a factor such as a living environment in the vicinity of the destination. For example, even when the destination is home, the first predetermined distance may be made shorter and the second predetermined distance may be made longer when the destination is close to, for example, a commercial area.

The first predetermined distance and the second predetermined distance may be stored in association with the destination, and the stored data may be read out by the drive control unit 244.

The timer unit 242 may measure the current time.

The measured time may be outputted to the drive control unit 244. In some embodiments, an illuminance sensor may be used instead of the timer unit 242.

The time measured may be used to check whether the current time is in a time zone from night to morning. For example, the "night" may be 7 p.m. at which family has returned home. For example the "morning" may be 7 a.m. at which there is a person who still sleeps.

The destination arrival distance calculation unit 243 may calculate an arrival distance to the destination, based on the destination obtained from the route guidance device 220 and the current position of the own vehicle obtained from the own vehicle position data receiver 210.

The arrival distance to the destination calculated by the destination arrival distance calculation unit 243 may be outputted to the drive control unit 244.

When the route guidance device 220 has a capability of calculating the arrival distance to the destination, data based on the capability may be used.

The drive control unit 244 may control the drive mode of the own vehicle to set the drive mode to the drive mode that is based on the traveling engine 110 while the current position of the own vehicle is at the first predetermined distance with respect to the destination in the time zone from the night to the morning. The drive control unit 244 may control the drive mode of the own vehicle to set the drive mode to the drive mode that is based on the traveling motor 120 when the current position of the own vehicle has reached the second predetermined distance with respect to the destination in the time zone from the night to the morning.
<Process of Hybrid Vehicle 1B>

An example of a process to be performed by the hybrid vehicle 1B according to the example embodiment will be described with reference to FIG. 9.

Figure 9:
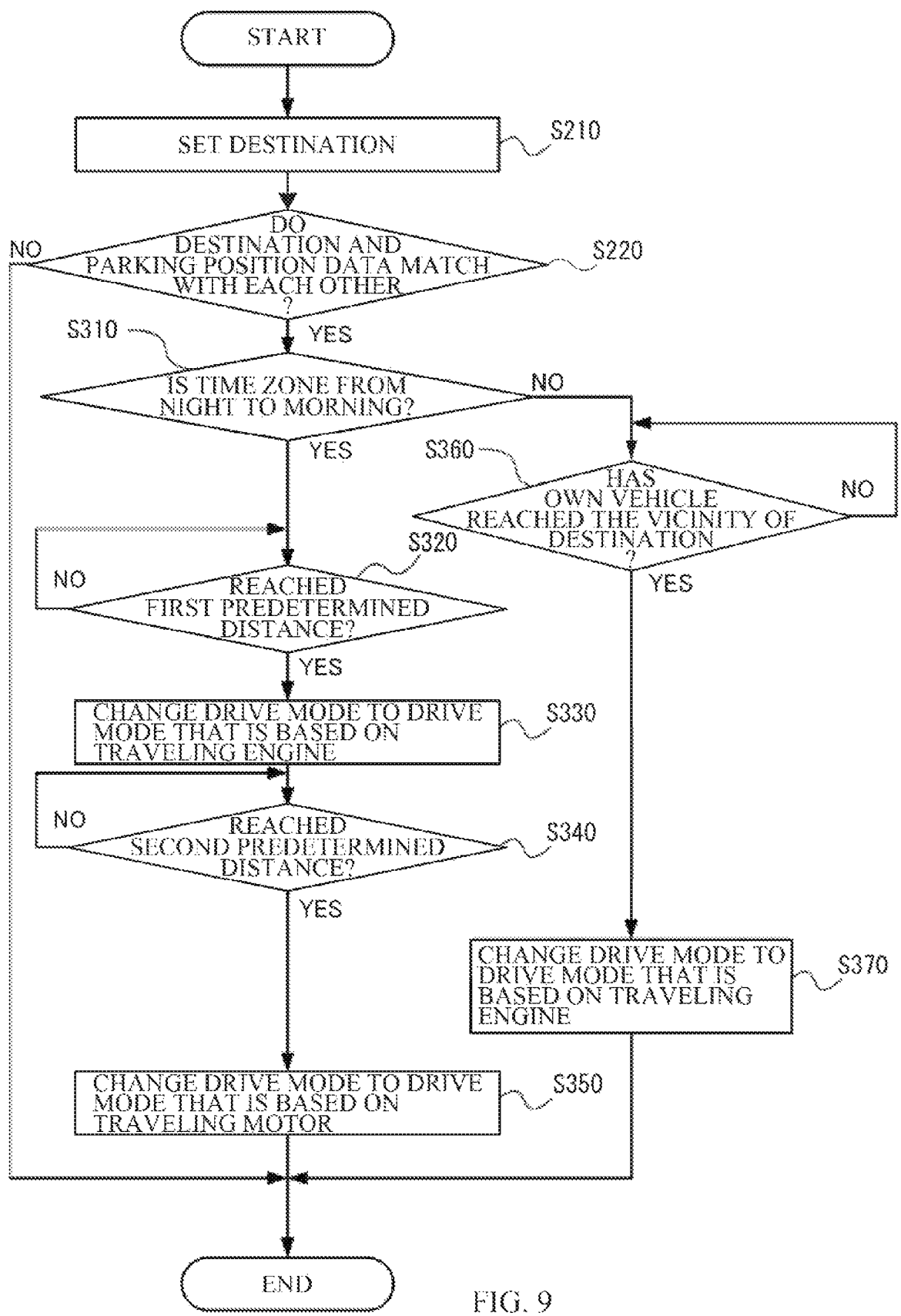
FIG. 9 is a diagram illustrating a flow of process to be performed by the hybrid vehicle illustrated in FIG. 7.

Referring to FIG. 9, the user may set a destination on the destination setting screen of the route guidance device 220 (step S210).

It should be noted that the setting of the destination may be based on the "destination" icon, the "display map" icon, or the preset individual icon.

The destination set by the user may be outputted to the drive processor 240B.

When the input of the destination is received from the route guidance device 220, the drive processor 240B may search the parking position data storage 230 for a parking position that matches the inputted destination to determine whether there is a parking position that matches the destination (step S220).

If the drive processor 240B determines that there is no parking position that matches the destination ("NO" in step S220), the drive processor 240B may end the process.

If the drive processor 240B determines that there is a parking position that matches the destination ("YES" in step S220), the drive processor 240B may determine whether the current time is in the time zone from the night to the morning, based on time measurement data obtained from the timer unit 242 (step S310).

If the drive processor 240B determines that the current time is in the time zone from the night to the morning ("YES" in step S310), the drive processor 240B may determine whether the own vehicle has reached the first predetermined distance (step S320).

If the drive processor 240B determines that the own vehicle has not reached the first predetermined distance ("NO" in step S320), the drive processor 240B may return the process to an original state and shift to a standby mode.

If the drive processor 240B determines that the own vehicle has reached the first predetermined distance ("YES" in step S320), the drive processor 240B may continue the drive mode that is based on the traveling engine 110 when the drive mode of the own vehicle is the drive mode that is based on the traveling engine 110, and may change the drive mode to the drive mode that is based on the traveling engine 110 when the drive mode of the own vehicle is the drive mode that is based on the traveling motor 120 (step S330).

Thereafter, the drive processor 240B may determine whether the own vehicle has reached the second predetermined distance (step S340).

If the drive processor 240B determines that the own vehicle has not reached the second predetermined distance ("NO" in step S340), the drive processor 240B may return the process to the original state and shift to the standby mode.

If the drive processor 240B determines that the own vehicle has reached the second predetermined distance ("YES" in step S340), the drive processor 240B may change the drive mode of the own vehicle from the drive mode that is based on the traveling engine 110 to the drive mode that is based on the traveling motor 120 (step S350), and end the series of processes.

If the drive processor 240B determines that the current time is not in the time zone from the night to the morning in step S310 ("NO" in step S310), the drive processor 240B may determine whether the own vehicle has reached the vicinity of the destination, based on the position of the own vehicle obtained from the own vehicle position data receiver 210 as a parameter directed to calculation of the distance to the destination (step S360).

If the drive processor 240B determines that the own vehicle has not reached the vicinity of the destination ("NO" in step S360), the drive processor 240B may return the process to the original state and shift to the standby mode.

If the drive processor 240B determines that the own vehicle has reached the vicinity of the destination ("YES" in step S350), the drive processor 240B may change the control to set the drive mode of the own vehicle to the drive mode that is based on the traveling engine 110 (step S370), and end the process.

<Workings and Example Effects>

The drive processor 240B of the hybrid vehicle 1B according to the example embodiment may control the drive mode of the own vehicle to set the drive mode to the drive mode that is based on the traveling engine 110 while the own vehicle is at the first predetermined distance with respect to the destination in the time zone from the night to the morning. When the own vehicle has reached the second predetermined distance with respect to the destination in the time zone from the night to the morning, the drive processor 240B may control the drive mode of the own vehicle to set the drive mode to the drive mode that is based on the traveling motor 120.

For example, when the destination is set to the home, the drive processor 240B may set the drive mode that is based on the traveling engine 110, in a range, from the first predetermined distance to the second predetermined distance, that is before the distance at which the notification is made that the own vehicle is in the vicinity of the destination in the time zone from the night to the morning, and set the drive mode of the own vehicle to the drive mode that is based on the traveling motor 120, in a range from the second predetermined distance to the home in the time zone from the night to the morning.

Thus, from the time of the night where family eats together to the time of the morning where there is a person who still sleeps, the time of the drive mode based on the traveling engine 110 may be made longer from a region that is before a region in the vicinity of the home, and the drive mode of the own vehicle may be changed to the drive mode that is based on the traveling motor 120 when the own vehicle approaches the home. This configuration helps to secure a forced charging period for the high-voltage battery 160 and the auxiliary battery 112, especially the auxiliary battery 112, while reducing a noise caused by an engine sound in the vicinity of the home.

Accordingly, the forced charging period for the high-voltage battery 160 and the auxiliary battery 112, especially the auxiliary battery 112, is secured while reducing the noise caused by the engine in the residential area, which helps to reduce a possibility of an occurrence of an event such as a restarting malfunction or a long cranking of the own vehicle.

In some embodiments, it is possible to implement the hybrid vehicle 1, 1A, or 1B of the example embodiment of the disclosure by recording the process to be executed by the drive processor 240, 240A, or 240B on a non-transitory recording medium readable by a computer system, and causing the computer system to load the program recorded on the non-transitory recording medium onto the drive processor 240, 240A, or 240B to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The drive processor 240, 240A, and 240B respectively illustrated in FIGS. 1, 3, and 7 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the drive processor 240, 240A, or 240B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the drive processor 240, 240A, or 240B illustrated in FIG. 1, 3, or 7.

The invention claimed is:

1. A hybrid vehicle as a vehicle, the hybrid vehicle comprising:
    a traveling engine;
    a traveling motor;
    a receiver configured to acquire a position of the vehicle;
    a storage configured to store a parking position including home of a user of the vehicle; and
    a processor configured to control a drive mode of the vehicle to set the drive mode to a first drive mode that is based on the traveling engine or a second drive mode that is based on the traveling motor, and control the drive mode of the vehicle to set the drive mode to the first drive mode when the vehicle has reached a vicinity of the parking position.

2. The hybrid vehicle according to claim 1, further comprising a route guidance device configured to perform a route guidance on the vehicle, based on the position of the vehicle and a destination designated by the user, wherein
    the route guidance device is configured to receive an input of the parking position from the user, and store the inputted parking position in the storage.

3. The hybrid vehicle according to claim 2, wherein
    the parking position stored in the storage comprises one or more parking positions including the home, and
    the processor is configured to, on a condition that the one or more parking positions are different from the destination designated by the user, control the drive mode of the vehicle to set the drive mode to the first drive mode when the vehicle has reached a vicinity of a position of the destination.

4. The hybrid vehicle according to claim 3, wherein the processor is configured to, in a time zone from night to morning:
    control the drive mode of the vehicle to set the drive mode to the first drive mode when the vehicle has reached a position that is at a first predetermined distance from the destination designated by the user, and
    control the drive mode of the vehicle to set the drive mode to the second drive mode when the vehicle has reached a position that is at a second predetermined distance from the destination, the second predetermined distance being shorter than the first predetermined distance.

5. The hybrid vehicle according to claim 2, wherein the processor is configured to, in a time zone from night to morning:
    control the drive mode of the vehicle to set the drive mode to the first drive mode when the vehicle has reached a position that is at a first predetermined distance from the destination designated by the user, and
    control the drive mode of the vehicle to set the drive mode to the second drive mode when the vehicle has reached a position that is at a second predetermined distance from the destination, the second predetermined distance being shorter than the first predetermined distance.

6. The hybrid vehicle according to claim 1, wherein the processor is configured to, in a time zone from night to morning:
    control the drive mode of the vehicle to set the drive mode to the first drive mode when the vehicle has reached a position that is at a first predetermined distance from a destination designated by the user, and
    control the drive mode of the vehicle to set the drive mode to the second drive mode when the vehicle has reached a position that is at a second predetermined distance from the destination, the second predetermined distance being shorter than the first predetermined distance.

* * * * *